Nov. 21, 1950    M. R. EHRENSTEIN    2,530,816
13-MONOMETHYL CYCLOPENTANOPOLYHYDROPHENANTHRENES
AND PROCESS
Filed Nov. 16, 1946
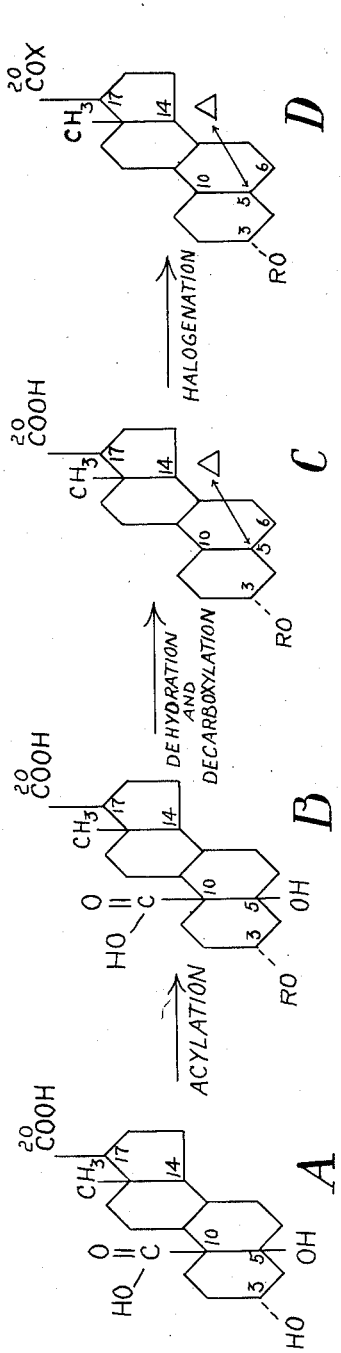
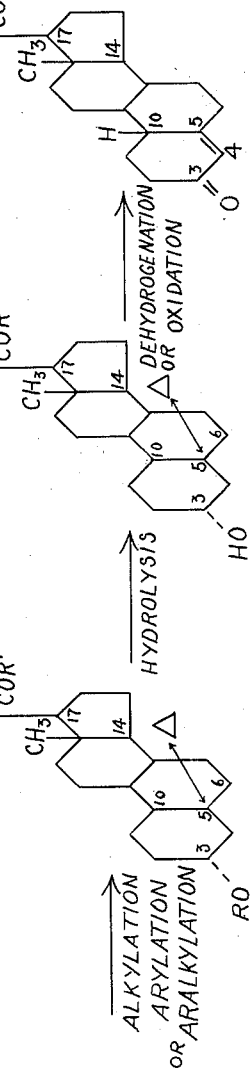
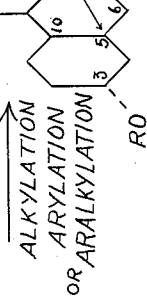
INVENTOR.
Maximilian R. Ehrenstein
BY
ATTORNEYS Patented Nov. 21, 1950

2,530,816

UNITED STATES PATENT OFFICE 2,530,816

13-MONOMETHYL CYCLOPENTANOPOLYHYDROPHENANTHRENES AND PROCESS

Maximilian R. Ehrenstein, Philadelphia, Pa., assignor to The Trustees of the University of Pennsylvania, Philadelphia, Pa., a corporation of Pennsylvania Application November 16, 1946, Serial No. 710,313

3 Claims. (Cl. 260—397.3)

This invention relates to certain new chemical compounds believed variously to have therapeutic value in the endocrine field and variously to have value as intermediates; and method for their production.

More specifically, the new chemical compounds contemplated by this invention will include the new compound 10-norprogesterone and a series of related compounds and various intermediates, which are produced in the course of their preparation by the method according to this invention. The several novel compounds, including intermediates found in the course of their preparation, contemplated by this invention will be disclosed specifically hereinafter.

The new compound, 10-norprogesterone, and the several other compounds contemplated have progestational activity rendering them useful therapeutically in the endocrine field. The new compounds comprising intermediates formed in the course of preparation of 10-norprogesterone and of the several other compounds contemplated by this invention will find utility in connection with the preparation of 10-norprogesterone and variously may be found to have therapeutic value.

The particular structure of the new compound, 10-norprogesterone, and of the several other novel compounds contemplated by this invention and the structure of the novel compounds comprising intermediates and the procedure according to the method of this invention is illustrated in the scheme shown in the accompanying drawing, with reference to which the nature of the several novel compounds and the details of the method will be described.

In the scheme:

The formulae illustrate the structures of the novel compounds contemplated by this invention and of the several intermediates formed in the course of their preparation and the several steps of the method according to this invention are broadly indicated.

In the scheme the starting material or compound is indicated at A. This material, a saturated dicarboxylic acid having the formula $C_{20}H_{30}O_6$ (estrane - 3,5 - diol - 10,17 - dicarboxylic acid), has heretofore been prepared and is described, for example, by Butenandt and Gallagher, Ber. 72, p. 1866 (1939); Chem. Abstr. 34, p. 773 (1940).

Proceeding now according to the method of this invention, as indicated in the scheme, the compound B is formed by acylation of the starting compound A to protect the hydroxyl group at carbon atom 3. The acylation of the compound A is, for example, effected by treatment with an acid anhydride, as, for example, acetic anhydride, propionic anhydride, or other suitable anhydride which will protect the hydroxyl group at carbon atom 3.

As exemplifying the procedure for acylation of the compound A, using acetic anhydride, a solution of 0.450 g. of recrystallized estrane-3,5-diol-10,17-dicarboxylic acid in 4.5 cc. of acetic anhydride is refluxed (metal-bath, 140–150° C.) for 30 minutes, after which 4.5 cc. of glacial acetic acid and 2.7 cc. of water are added to decompose anhydrides and the solution then heated on a water bath for about one hour. On completion of the heating the solvent is removed in vacuo (50° C.) and the sirupy residue taken up in ether and the solution extracted twice with ice cold dilute sodium carbonate. The combined extracts are acidified by adding without delay ice cold dilute hydrochloric acid which will cause a white flocculent precipitate to appear. The suspension is then extracted three times with ether and the combined ether extracts washed several times with small quantities of water. After drying and filtering, evaporation of the ether yields a product, usually obtained as a foamy, colorless glass. This product, which comprises the compound B, is then, for analysis, dried at 85° C. under slight vacuum in order to avoid possible decomposition and analyzes as follows:

Calculated for $C_{22}H_{32}O_7$ (monoacetate): C, 64.66; H, 7.90. Found: C, 64.20; H, 7.36.

Proceeding now from the compound B to the compound C, which, for example, may be 3-acetoxy - 10 - noretiocholenic acid (3-acetoxyestrene-17-carboxylic acid), the compound B is subjected to heating in a high vacuum to effect dehydration and decarboxylation of the compound B. Preferably the compound B will be subjected to distillation in a high vacuum.

As exemplifying the procedure for the preparation of compound C from the compound B, where the compound B is, for example, an acetate, 0.590 g. of the crude compound B is transferred into a high vacuum retort by means of ether. After careful removal of the solvent, a foamy glass remains, which, on gentle heating in a high vacuum to a temperature of 80–120° C., is almost completely liquefied or sintered. The material thus obtained, essentially free from solvent, is subjected to distillation in a high vacuum. In effecting the distillation the temperature is raised fairly quickly to about 180° C. where gas evolution will be observed. Subsequently, the temperature is raised slowly, say within a period of about one hour, to 250° C. and then quickly raised to about 290° C. and the distillation thereafter interrupted. The distillate, usually a slightly yellow, brittle glass, is subjected to another distillation under practically identical conditions, it being noted that in the redistillation there is no notable gas evolution. The product usually is a slightly yellow, brittle glass and gives a strong positive reaction with tetranitromethane. Analysis shows the following:

Calculated for $C_{21}H_{30}O_4$: C,72.78; H,8.73. Found: C,73.36, 72.78; H,8.30, 8.51.

Titration: 11.2 mg. of the product required 3.31 cc. of 0.01 N NaOH; calculated for monocarboxylic acid $C_{21}H_{30}O_4$; 3.23 cc.

In this product as illustrated in the scheme the double bond has been indicated in the 5,6 position, though it may be in the 5,10 position, or in the 4,5 position, or the product may be a mixture of any two or all of these isomers hereinafter indicated by reference to "and/or isomers." However, no attempt was made to separate these isomers.

Proceeding now for the preparation of the compound D, which, for example, may be 3-acetoxy-10-noretiocholenic acid chloride (3-acetoxy-estrene-17-carboxylic acid chloride) and/or isomers, the compound C is directly transformed into the corresponding acid chloride and/or isomers by means of, for example, thionyl chloride, phosphorous oxychloride or phosphorous pentachloride. It will be understood that the compound D may be prepared as an acid bromide by using an equivalent bromide in place of the aforementioned chlorides.

As exemplifying the procedure for the preparation of the compound D from the compound C, a purified, colorless thionyl chloride is prepared, for example, by distilling pure commercial thionyl chloride (Eastman), of a slightly yellow color, over quinoline and then over linseed oil. To 200 mg. of the compound C, and/or isomers, is added in a cold room 1.0 cc. of the purified thionyl chloride. The mixture is allowed to stand under anhydrous conditions in the cold room (about 2° C.) for a period of about 50 minutes and then at room temperature (20° C.) for about 3½ hours, which usually results in the formation of an olive green solution. The solution thus formed is brought to dryness in vacuo (40° C.) under anhydrous conditions. The residue is then dried overnight in a vacuum dessicator ($P_2O_5$, KOH).

The acid chloride, or the bromide, thus prepared serves for the production of the compound E, as, for example, 3-acetoxy-10-norpregnene-20-one and/or isomers.

The compound D, or related compounds indicated above and/or isomers, is of value not only as an intermediate for the preparation of the novel compound 10-norprogesterone according to the method of this invention, but likewise is useful for the preparation of the novel compound 10-nor-11-desoxycorticosterone acetate, and which novel compound, together with various intermediates useful for its preparation and method for the preparation thereof, forms the subject-matter of an application for patent filed by me Serial No. 147,970, filed February 15, 1946, now Patent No. 2,496,450.

The preparation of the compound E, or related compounds indicated above and/or isomers, from the compound D is accomplished by treatment of the compound D or related compounds indicated above and/or isomers with a methylzinc halide, preferably methylzinc iodide or with dimethyl cadmium.

As exemplifying procedure for transforming, for example, the compound D to, for example, the compound E, a fuming, colorless solution of methylzinc iodide is prepared by adding a zinc-copper couple, prepared from 2 g. of zinc (Zinc Reagent—Merck, Mossy cut in small pieces of 1–3 mm. size) and 0.2 g. of copper powder, by the method of Job and Reich, Bull. Soc. Chim. [4], 33, 1414 (1923), and an iodine crystal to a mixture of 2.33 g. of methyl iodide (Eastman, pure), 0.5 cc. of dry alcohol-free ethyl acetate, and 1.0 cc. of dry toluene. The mixture was heated (reflux condenser) under anhydrous conditions in a metal bath to 80° C. Over a period of 1½ hours the temperature was gradually raised to 120° C., where it was kept for 45 minutes. After cooling to room temperature the mixture was diluted with 1.0 cc. of toluene.

The organo-zinc solution is decanted from excess metal and ice-cooled, then a solution of the compound D, prepared from 200 mg. of compound C, in 1.0 cc. of dry benzene is slowly added. The mixture is allowed to stand at room temperature (24° C.) for about 30 minutes. After cooling with ice, water is gradually added, which results in the formation of a thick precipitate which is brought into solution by adding an excess of N sulfuric acid until acid to Congo. The reaction mixture is then extracted with an ample quantity of ether and the ether extract washed with a concentrated solution of ammonium sulfate, water, a solution of N sodium hydroxide and then three times with small quantities of water (neutral ether extract).

The neutral ether extract is dried with sodium sulfate, brought to dryness in vacuo (40° C.) and the residue dried in a vacuum desiccator ($P_2O_5$; KOH). The residue is usually an orange-colored viscous oil, amounting to about 135 mg.

The neutral residue is subjected to chromatographic adsorption by dissolving it in a mixture of 10 cc. of benzene and 25 cc. of petroleum ether and subsequently filtering through a column of 6.0 g. of aluminum oxide. The original solution is passed through within about two hours and the eluates each within 15 minutes. The following fractionation is obtained:

| No. of Fraction | Solvent | Weight of Residue, mg. | Appearance of Residue |
|---|---|---|---|
| 1 | 10 cc. Benzene+25 cc. petr. ether (original solution) | 13.0 | colorless sticky oil. |
| 2 | 6 cc. benzene+14 cc. petr. ether | 46.1 | slightly yellow sticky oil. |
| 3 | 8 cc. benzene+12 cc. petr. ether | 21.1 | colorless resin. |
| 4 | 10 cc. benzene+10 cc. petr. ether | 11.4 | Do. |
| 5 | 13 cc. benzene+7 cc. petr. ether | 6.8 | Do. |
| 6 | 17 cc. benzene+3 cc. petr. ether | 5.9 | Do. |
| 7 | 20 cc. benzene | 4.6 | Do. |
| 8 | 20 cc. benzene | 2.3 | Do. |
| 9 | 17 cc. benzene+3 cc. ether | 4.2 | Do. |
| 10 | 13 cc. benzene+7 cc. ether | 1.9 | Do. |
| 11 | 10 cc. benzene+10 cc. ether | 1.0 | Do. |
| 12 | 5 cc. benzene+15 cc. ether | 0.5 | |
| 13 | 20 cc. ether | 0.4 | |
| 14 | 20 cc. ether | 1.1 | colorless resin. |
| 15 | 19 cc. ether+1 cc. methanol | 6.4 | yellow resin. |
| 16 | 30 cc. methanol | 10.6 | whitish-brownish residue. |
| | Total | 137.3 | |

Fractions 2-8, inclusive of the chromatogram (98.2 mg.) are combined and subjected to a distillation in high vacuum, heating to 110° C. within 10 minutes and gradual raising of the temperature to slightly above 200° C. within a period of one hour, which yields about 87.5 mg.

The major part of the distillate (76.8 mg.) is subjected to further purification by means of Girard's reagent T (betaine hydrazide hydrochloride) by the addition of 110 mg. of Girard's reagent and 0.06 cc. of glacial acetic acid to the distillate dissolved in 1.0 cc. of methanol and refluxing on a water bath for 1 hour and then allowing to stand in the cold room for two days. Thereafter the mixture is cooled to −5° C. and about 1 g. of ice and an ice cold solution of 0.05 g. of sodium carbonate in 1 cc. of water is added. The mixture is then quickly extracted twice with ether in the cold room and the combined ether phases washed at room temperature successively with water, a solution of N sodium carbonate and four times with water. After drying with sodium sulfate and removal of the ether, an almost colorless resin is usually obtained (non-ketonic fraction).

The aqueous phase is then made acid to Congo by adding 1 cc. of 4 N sulfuric acid in the cold room and the resultant mixture extracted four times with ether at room temperature and the combined ether phases washed successively with water, a solution of N sodium carbonate and four times with water. After drying the ethereal solution with sodium sulfate and subsequent removal of the ether an almost colorless, soft resin (ketonic fraction) is usually obtained. An additional amount of the ketonic fraction can be obtained by subjecting the non-ketonic fraction above to treatment with Girard's reagent under the conditions indicated above.

The almost colorless, soft resin (ketonic fraction: about 47.4 mg.) obtained above is subjected to distillation in a high vacuum, yielding as the distillate usually a slightly yellow, viscous resin which comprises the compound E and/or isomers.

The preparation of the compound F, 10-norpregnene-20-one,3-ol, and/or isomers, from the compound E or related compounds indicated above and/or isomers, is accomplished by hydrolysis, preferably under alkaline conditions, of the compound E to replace the acyloxy group at carbon atom 3 with a hydroxyl group.

As exemplifying procedure for the hydrolysis of, for example, the compound E, 3-acetoxy-10-norpregnene-20-one and/or isomers, to 39.2 mg. of the compound E, dissolved in 1.0 cc. of methanol is added a solution of 0.1 g. of potassium carbonate in 0.5 cc. of water and 1 cc. of methanol. The mixture is refluxed on a water bath for 1½ hours and is then made acid to Congo by the addition of dilute hydrochloric acid. The major part of the methanol is then removed in vacuo (40° C.) and the mixture extracted with ether. The ether phase is washed with a little water, a solution of N sodium carbonate and three times with water. After drying with sodium sulfate and evaporation of the ether, usually an amber colored resin comprising the compound F is obtained.

The preparation of 10-norprogesterone (compound G) from the compound F and/or isomers is accomplished by dehydrogenation of the compound F using, for example, the method described by Oppenauer Rec. Trav. Chim. 56, 137 (1937), though other suitable methods for dehydrogenation may be used.

As exemplifying procedure for transforming the compound F to the compound G, to 4 cc. of a clear solution of about 100 mg. of aluminum tert.-butoxide (Eastman) in 1.0 cc. of dry benzene is added about 29.7 mg. of the compound F dissolved in 1.2 cc. of dry acetone. The resulting solution is refluxed under anhydrous conditions on a water bath for a period of 10 hours, during which time an additional 0.2 cc. of dry acetone is added. The solution is permitted to stand at room temperature overnight, then an ample amount of ether and thereafter some N sulfuric acid are added to the solution. The ether phase is separated and washed with a dilute solution of sodium bicarbonate and three times with water. After drying with sodium sulfate and removal of the ether a yellowish, soft resin is usually obtained amounting to about 30.4 mg.

The resin thus obtained is purified by chromatographic adsorption by dissolving it in a mixture of 7.5 cc. of benzene and 22.5 cc. of petroleum ether and by subsequently filtering said solution through a column of 2.0 g. of aluminum oxide during a period of about three hours, the eluents being passed through each other a period of 30 minutes. The following chromatographic fractionation is obtained:

| No. of Fraction | Solvent | Weight of Residue, Mg. | Appearance of Residue |
|---|---|---|---|
| 1 | 7.5 cc. benzene+22.5 cc. petr. ether (original solution) | 1.9 | colorless resin. |
| 2 | 2.5 cc. benzene+7.5 cc. petr. ether | 0.6 | colorless residue. |
| 3 | 3.5 cc. benzene+6.5 cc. petr. ether | 0.2 | Do. |
| 4 | 5 cc. benzene+5 cc. petr. ether | 1.4 | Do. |
| 5 | 7 cc. benzene+3 cc. petr. ether | 4.3 | colorless resin. |
| 6 | 9 cc. benzene+1 cc. petr. ether | 4.1 | Do. |
| 7 | 10 cc. benzene | 2.2 | Do. |
| 8 | 10 cc. benzene | 0.9 | Do. |
| 9 | 8 cc. benzene+2 cc. ether | 2.4 | colorless glass. |
| 10 | 6 cc. benzene+4 cc. ether | 0.6 | colorless residue. |
| 11 | 4 cc. benzene+6 cc. ether | 1.7 | colorless resin. |
| 12 | 10 cc. ether | 2.1 | Do. |
| 13 | 10 cc. ether | 0.2 | Do. |
| 14 | 7.5 cc. ether+2.5 cc. methanol | 5.4 | light yellow glass. |
| 15 | 10 cc. methanol | 3.0 | whitish mass. |
| Total | | 31.0 | |

The fractions 4-8, inclusive, of the above chromatogram are combined (about 12.9 mg.) and subjected to distillation in a high vacuum, heating to 115° C. within about 10 minutes, and then gradually raising the temperature to slightly above 200° C. within a period of 40 minutes. The distillate, comprising 10-norprogesterone, is usually an almost colorless (very pale yellow) soft resin which analyzes as follows:

Calculated for $C_{20}H_{28}O_2$: C, 79.94; H, 9.40. Found: C, 79.12; H, 9.40.

The compound is further characterized by its ultra-violet absorption spectrum:

$$\lambda_{max}=238.5 m\mu; \quad \epsilon=16560$$

By reference to the scheme shown in the drawing it will be appreciated that from the broad standpoint this invention is not limited in the case of compounds D, E, F and G to compounds having the grouping COCl or COCH₃ at carbon atom 17, but to the contrary contemplates also broadly those compounds having the structure of compound D except for the fact that they have the grouping COX at carbon atom 17, where X is chlorine or bromine, and also broadly those compounds having the structure of compounds E, F and G except for the fact that they have the grouping COR' at carbon atom 17, where R' is an alkyl group of not in excess of 10 carbon atoms, as for example, methyl, ethyl, propyl, butyl, pentyl, hexyl, heptyl, octyl, nonyl, decyl, a phenyl group or a benzyl group. From the more specific standpoint, those compounds where R' is an alkyl group containing not more than five carbon atoms are contemplated.

The compounds having the grouping COR' at carbon atom 17 may be formed by treating the compound D to form the compound E as described above except for the use of an alkyl zinc halide of not in excess of 10 carbon atoms, a phenyl or a benzyl zinc halide or a dialkyl cadmium of not in excess of 10 carbon atoms, a diphenyl or a dibenzyl cadmium in place of a methylzinc halide or dimethyl cadmium.

It will be understood, with reference to the several compounds illustrated and described above, that I do not intend that this invention or the claims appended hereto shall be limited to any particular configuration about any carbon atom and, in particular, about carbon atoms 3, 10, 14 and 17.

This application is a continuation-in-part of an application filed by me on March 24, 1945, Serial No. 584,623, now abandoned.

What I claim and desire to protect by Letters Patent is:

1. A 13-monomethyl-cyclopentanopolyhydrophenanthrene having the following structure:

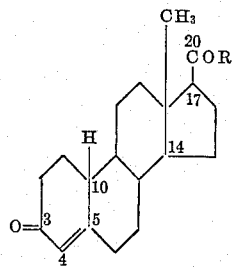

where R' is a member of the group consisting of alkyl groups of not in excess of ten carbon atoms.

2. A compound according to claim 1, characterized by the following structure:

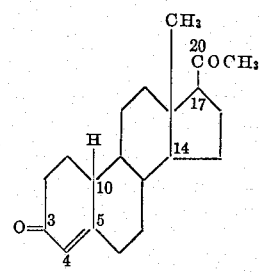

3. The process of preparing a compound according to claim 1, which comprises acylating with a lower alkyl carboxylic acid anhydride under reflux conditions at carbon atom 3 a compound having the following structure:

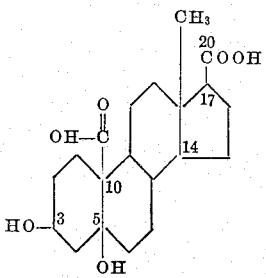

dehydrating and decarboxylating the acylation product by heating in vacuo, halogenating with a compound selected from the class consisting of thionyl chloride, phosphorous oxychloride and phosphorous pentachloride, the product of dehydration and decarboxylation thereby effecting substitution of a member of the group consisting of chlorine and bromine for OH at carbon atom 20, alkylating the halogenated product with an alkyl metal compound thereby effecting substitution of a member of the group consisting of alkyl of not in excess of ten carbon atoms for the halogen at carbon atom 20, hydrolyzing the product of alkylation thereby effecting substitution of H for the acyl group at carbon atom 3 and dehydrogenating the product of hydrolysis at carbon atom 3.

MAXIMILIAN R. EHRENSTEIN.

REFERENCES CITED

The following references are of record in the file of this patent:

UNITED STATES PATENTS

| Number | Name | Date |
|---|---|---|
| 2,232,438 | Butenandt | Feb. 18, 1941 |

OTHER REFERENCES

Allen et al., Science, 100, pages 251–252 (1944).